United States Patent [19]

Stivers et al.

[11] Patent Number: 4,595,720

[45] Date of Patent: Jun. 17, 1986

[54] PROCESSING ELASTOMERS

[75] Inventors: David A. Stivers; Richard A. Guenthner, both of St. Paul, Minn.

[73] Assignee: Minnesota Mining and Manufacturing Company, St. Paul, Minn.

[21] Appl. No.: 749,123

[22] Filed: Jun. 26, 1985

Related U.S. Application Data

[63] Continuation of Ser. No. 538,378, Oct. 3, 1983, abandoned.

[51] Int. Cl.$^4$ ............................................... C08K 5/34
[52] U.S. Cl. ................................... 524/100; 524/101; 524/520
[58] Field of Search ...................... 524/100, 101, 520

[56] References Cited

U.S. PATENT DOCUMENTS

| | | | |
|---|---|---|---|
| 2,968,649 | 1/1961 | Pallthorp | 260/80.5 |
| 3,051,677 | 8/1962 | Rexford | 260/29.6 |
| 3,075,979 | 1/1963 | Tazuma et al. | 260/248 |
| 3,159,609 | 12/1964 | Harris et al. | 260/87.5 |
| 3,318,854 | 5/1967 | Honn et al. | 260/87.7 |
| 3,467,635 | 9/1969 | Brasen et al. | 260/80.76 |
| 3,753,937 | 8/1973 | Stivers | 260/28.5 |
| 3,845,166 | 10/1974 | Betts et al. | 524/101 |
| 3,903,063 | 9/1975 | Perkins | 260/80.78 |
| 3,923,621 | 12/1975 | Murayama et al. | 204/159.17 |
| 3,959,219 | 5/1976 | Aoyama et al. | 524/101 |
| 3,987,126 | 10/1976 | Brodoway | 260/884 |
| 4,018,852 | 4/1977 | Schober | 524/101 |
| 4,035,565 | 7/1977 | Apotheker et al. | 526/249 |
| 4,214,060 | 7/1980 | Apotheker et al. | 525/387 |
| 4,233,421 | 11/1980 | Worm | 525/343 |
| 4,263,414 | 4/1981 | West | 525/102 |
| 4,287,320 | 9/1981 | Kolb | 525/340 |
| 4,328,140 | 5/1982 | Singletary et al. | 524/322 |
| 4,331,780 | 5/1982 | Brady | 524/101 |

FOREIGN PATENT DOCUMENTS

| | | |
|---|---|---|
| 360946 | 6/1929 | Belgium . |
| 65477 | 11/1982 | European Pat. Off. . |
| 2332681 | 1/1974 | Fed. Rep. of Germany . |
| 4871444 | 9/1973 | Japan . |
| 544949 | 1/1979 | Japan . |
| 2052494 | 1/1981 | United Kingdom . |
| 46205 | 6/1982 | U.S.S.R. . |
| 939475 | 6/1982 | U.S.S.R. . |

OTHER PUBLICATIONS

Vol. 134 No. 18 Part 1, 5/1/63 p. 7190, Akademie Verlag GmbH, Berlin, DE & JP.-A-No. M566/1966, 11/30/60 Fukui et al.

Kirk-Othmer, Encyclopedia of Chemical Technology, 3rd Edition, vol. 7, John Wiley & Sons, 1979, pp. 397–410 3 & 4.

*Primary Examiner*—Joseph L. Schofer
*Assistant Examiner*—N. Sarofin
*Attorney, Agent, or Firm*—Donald M. Sell; James A. Smith; William G. Ewert

[57] ABSTRACT

The processing of elastomer gums, which can be natural rubber or synthetic elastomers such as copolymers of vinylidene fluoride and hexafluoropropylene, are improved by incorporating in said gum, along with conventional chemical and compounding ingredients, cyanuric acid or isocyanurate or cyanurate derivatives thereof to improve the processing of such gums, for example, to improve the extrudability thereof or the release of molded articles thereof from the mold.

21 Claims, No Drawings

PROCESSING ELASTOMERS

This is a continuation of application Ser. No. 538,378 filed Oct. 3, 1983 now abandoned.

This invention relates to elastomer gum compositions and their preparation, processing, and use. In another aspect, it relates to fluoroelastomer gumstocks, e.g., compounded copolymers of vinylidene fluoride and hexafluoropropylene, containing a processing aid, and to their preparation and processing. In a still further aspect, it relates to cyanuric acid and their derivatives, and the use of such substances in the processing of vulcanizable elastomer compositions.

In order to convert elastomer gums or compounded gumstocks thereof to finished elastomer goods or articles with desired properties, it is common to incorporate into or mix with such elastomer gums various chemical and compounding ingredients, each having a specific function such as in the processing and vulcanization of such elastomer gums or in the end use thereof. One type of such ingredients is processing aids, which are commonly used to modify the viscosity and toughness of the raw or unvulcanized elastomer gum, or to aid it in a specific manner, during or in the processing thereof, e.g., mixing, milling, mastication, shaping, or vulcanization of the gum or gumstock. Such aids, as well as other chemical or compounding ingredients, are usually incorporated into the gum with a mill or an internal mixer (such as a Banbury mixer). The compounded elastomer gumstock can then be fabricated by molding, calendering, or extrusion into the desired shaped article, which is then subjected to vulcanization (curing), transforming the relatively soft, weak, elastomer gum into a finished article made of non-tacky, strong, insoluble, chemically and thermally resistant elastomer.

Various materials have heretofore been prepared and used as processing aids, such as various waxes and oils. For example, in the processing of fluoroelastomers, e.g., copolymers of vinylidene fluoride and hexafluoropropylene, which are particularly difficult to process, mixtures of oleic acid and low molecular weight polyethylene have been proposed (see U.S. Pat. No. 4,328,140, Singletary, et al) as have carnauba wax and montan wax (see U.S. Pat. No. 3,753,937, Stivers) and diorgano sulfur oxide compounds (see U.S. Pat. No. 4,287,320, Kolb). Although conventional processing aids provide many useful benefits in the processing of elastomer gums, as mentioned above, some do not perform as well as desired, some of these interfere with the curing of the gum, and others adversely affect the final physical properties, shape, and visual appearance of the cured elastomer or finished goods.

Briefly, this invention in one aspect involves mixing or incorporating cyanuric acid or its isocyanurate or cyanurate derivatives with or into elastomer gums. The resulting mixtures or gumstocks can then be processed, e.g., shaped and vulcanized, in an enhanced manner. For example, the mixtures of elastomer gums and cyanuric acid or (preferably) isocyanurates or cyanurates have improved extrudability (as manifested by the improved appearance and shape of extrusions thereof), molded articles thereof are readily released from their molds without distortion or damage and without requiring treatment of the mold with a release agent, and such mixtures are more easily milled with other compounding and chemical adjuvants, the cyanuric acid and its derivatives as processing aids, and amounts thereof used, being compatible with the gums and having no adverse affect on the crosslinking of the gums or on other desired properties of the gumstocks or finished goods made therefrom.

Cyanuric acid is commonly used to collectively refer to two equilibrated tautomer species, i.e., the trihydroxy or enol tautomer (specifically called cyanuric acid), and the trioxide or keto tautomer (specifically called isocyanuric acid), these tautomers and their equilibrium being illustrated as follows.

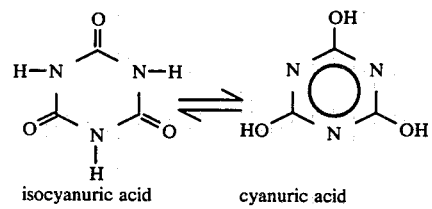

isocyanuric acid      cyanuric acid

When reference is made generically or collectively to these acids, the term "(iso)cyanuric acid" will be used, as is a common practice (e.g., see Kirk-Othmer, Encyclopedia of Chemical Technology, 3rd Edition, Vol. 7, John Wiley and Sons, 1979, page 397). In the mono-, di-, and tri-substituted derivatives of these acids, the substituents bonded to the ring atoms can vary widely, but in the derivatives used in this invention to process peroxide-curable elastomers, such as fluoroelastomers, those substituents are preferably free of ethylenic, e.g. allylic, unsaturation or at least no more than one of the substituents should contain such ethylenic unsaturation, lest such unsaturated derivatives affect crosslinking of the elastomers or function as crosslinking agents.

Preferred classes of the (iso)cyanuric acid derivatives useful in the practice of this invention can be expressed in terms of the following formula:

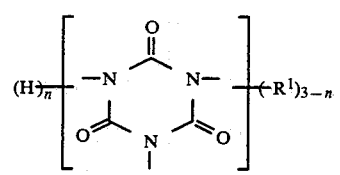

where
$R^1$ is an aliphatic radical or aryl radical, or combinations thereof, such as aralkyl, and
n is 0, 1, or 2; and

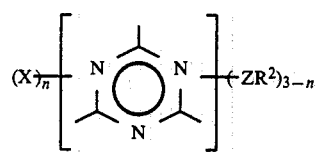

where
Z is O, S or NR (where R is H or lower alkyl, e.g., $C_1$ to $C_4$),
$R^2$ is as defined above for $R^1$,
X is halogen, OH, $O(M)_{1/z}$ (where M is a metal ion, e.g., $Na^+$, $Ca^{++}$, $Mg^{++}$, $Al^{+++}$, and z is the valence thereof), or NHR (where R is H or lower alkyl, e.g., $C_1$ to $C_4$), n is 0, 1, or 2.

Where $R^1$ and $R^2$ are aliphatic groups, they are preferably free of ethylenic unsaturation, for reasons given above, and where they are alkyl radicals they can have 1 to 24 carbon atoms and although they are preferably unsubstituted linear, branched, or cyclic, they can contain hetero atoms such as O, S, and N, and halogen substituents such as chlorine or fluorine. Where $R^1$ or $R^2$ is an aryl or aralkyl radical, it is preferably unsubstituted but may contain such hetero or halogen atoms as well. $R^1$ or $R^2$ can also contain one or more isocyanurate or cyanurate rings. Due to the nature of their preparation, the above-described (iso)cyanuric acid derivatives will actually be used in the form of mixtures thereof, the subscript n thus representing an average value for such mixture of compounds, e.g., a mixture of equimolar amounts of $C_3N_3O_3(R)_3$, $C_3N_3O_3(R)_2H$ and $C_3N_3O_3(R)H_2$.

Isocyanurates and cyanurates are known chemical compounds and are conveniently prepared, for example, from cyanuric chloride and cyanuric acid, respectively, and the appropriate organic reagents, e.g., see Burakevich in Kirk-Othmer, Encyclopedia of Chemical Technology, 3rd Edition, Vol. 7, Wiley Interscience, New York, 1979, pages 397–410, and U.S. Pat. No. 3,075,979 (Tazuma, et al).

The following reaction schemes illustrate the synthesis of isocyanurates and cyanurates.

Scheme 1

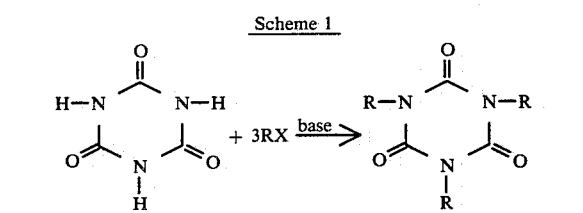

Scheme 2

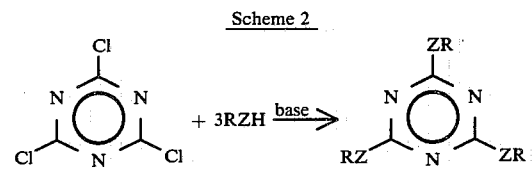

Scheme 3

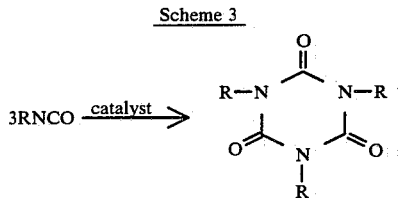

Scheme 4

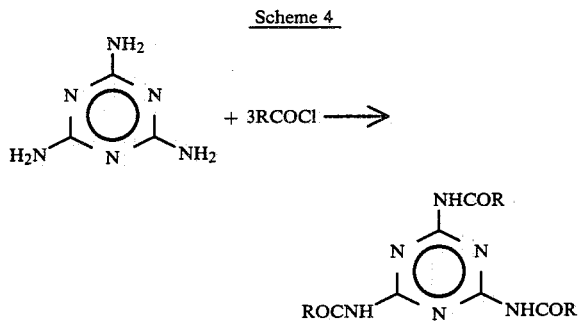

Scheme 5

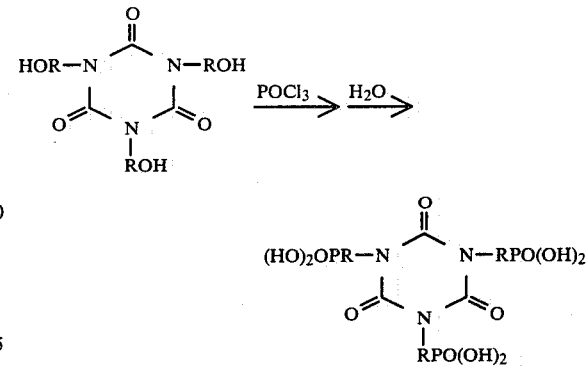

Use of mixed reagents in a given reaction scheme will give isocyanurates and cyanurates having mixed substituents. In the cases where mono- and disubstituted cyanurates are present in product mixtures, residual chlorine substituents may be present in the cyanurate products, e.g., $C_3N_3Cl(OR)_2$, as well as the corresponding hydrolyzed material, $C_3N_3OH(OR)_2$. Tautomeric forms of partially substituted isocyanurate and cyanurate compounds may be present, e.g.,

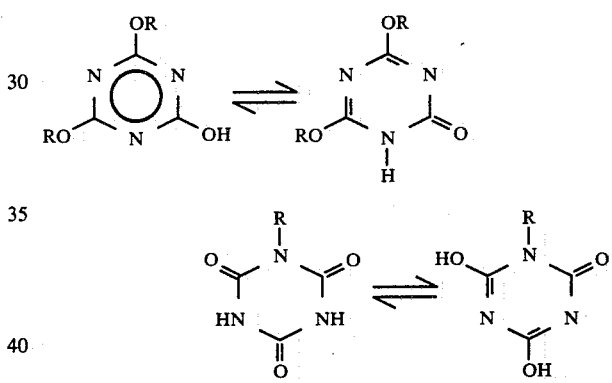

These tautomeric forms, and isocyanurates and cyanurates having mixed substituents, are also useful as processing aids in this invention. If a difunctional (or a polyfunctional) organic reagent is used (preferably along with monofunctional reagents) in the synthesis of the (iso)cyanuric acid derivatives of this invention, di(or poly-)isocyanurates or cyanurates can be prepared. These compounds are also useful as processing aids in this invention.

Representative reactive organic halogen compounds for use in preparing isocyanurate compounds according to Scheme 1 include for use in this invention
$C_2H_5Br$
$C_{10}H_{21}Br$
$C_{18}H_{37}Br$
$C_6H_5CH_2Cl$
$C_4H_9OCOCH_2Cl$
$C_8F_{17}SO_2N(CH_3)(CH_2)_4Br$
$C_6F_{13}CH_2CH_2I$
$ClC_6H_5CH_2Cl$
$CH_3COCH_2Cl$
$Br(CH_2)_4Br$ Representative alcohols, thiols, sulfonamides, and amines useful in Scheme 2 for the synthesis of cyanurates used in this invention include
$C_2H_5OH$ $C_8H_{17}OH$
$C_{18}H_{37}OH$
$C_8F_{17}SO_2N(C_2H_5)C_2H_4OH$
$C_8F_{17}SO_2N(C_2H_5)(C_2H_4O)_3H$
$C_7F_{15}CH_2OH$
$C_8F_{17}C_2H_4OH$
$C_8F_{17}SO_2N(CH_3)H$
$CH_3(OC_2H_4)_7OH$
$C_8F_{17}SO_2N(CH_3)C_2H_4SH$
$C_6F_{13}C_2H_4SH$
$C_6F_{13}C_2H_4SC_2H_4OH$
$C_8F_{17}SO_2N(CH_3)C_2H_4N(CH_3)H$
$(CF_3)_2CF(CF_2)_8C_2H_4SH$
$C_6H_5OH$
$C_6H_5CH_2OH$
$HO(CH_2)_4OH$

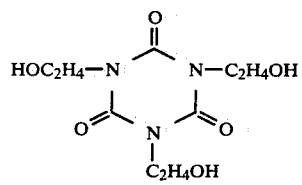

Other representative reagents useful in Schemes 3, 4 and 5 include
$POCl_3$
$C_9H_{19}COCl$
$C_6H_{13}NCO$
$C_6H_5NCO$
$C_7F_{15}COCl$
$C_{18}H_{37}NCO$

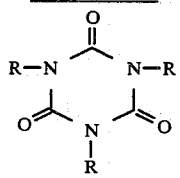

Representative isocyanurates and cyanurates useful in the practice of this invention are listed in Tables 1 and 2.

TABLE 1
Isocyanurates

| Code | R Substituents No. of | Formula |
|---|---|---|
| I-1 | 2 | $C_2H_5$ |
|  | 1 | H |
| I-2 | 2 | $C_{18}H_{37}$ |
|  | 1 | H |
| I-3 | 3 | $CH_2C_6H_5$ |
| I-4 | 1 | $C_2H_5$ |
|  | 2 | H |
| I-5 | 2 | $CH_3$ |
|  | 1 | H |
| I-6 | 2 | $C_2H_5$ |
|  | 1 | $CH_2CH=CH_2$ |
| I-7 | 3 | $C_2H_4OPO(OH)_2$ |
| I-8 | 3 | $C_3H_7$ |
| I-9 | 3 | $C_{18}H_{37}$ |
| I-10 | 2 | $C_3H_7$ |

TABLE 1-continued
Isocyanurates

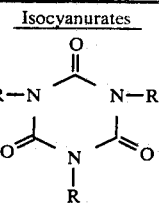

| Code | R Substituents No. of | Formula |
|---|---|---|
|  | 1 | $C_{16}H_{33}$ |

TABLE 2
Cyanurates

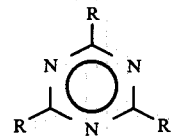

| Code | R Substituents No. of | Formula |
|---|---|---|
| C-1 | 3 | $OC_{18}H_{37}$ |
| C-2 | 2 | $OC_{18}H_{37}$ |
|  | 1 | Cl |
| C-3 | 3 | $N(CH_3)SO_2C_8F_{17}$ |
| C-4 | 3 | $OC_2H_4O(C_2H_4O)_6CH_3$ |
| C-5 | 3 | $OC_2H_4C_8F_{17}$ |
| C-6 | 3 | $(OC_2H_4)_3N(C_2H_5)SO_2C_8F_{17}$ |
| C-7 | 3 | OH |
| C-8 | 3 | ONa |
| C-9 | 3 | $OC_2H_5$ |
| C-10 | 3 | $OC_{10}H_{21}$ |
| C-11 | 2 | $OC_2H_5$ |

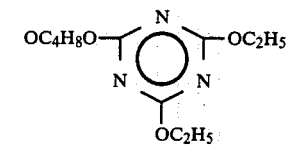

The amount of processing aid incorporated into the elastomer gum composition will vary, depending upon the particular elastomer gum and particular processing aid used, and on the particular function or property desired to be performed or obtained by the processing aid. Functionally speaking, the amount of processing aid to be used will be that amount sufficient to improve the processing of the compounded elastomer composition. Generally, the amount of processing aid to be used will be low or about 0.1 to 20 parts by weight per 100 parts of elastomer gum, preferably 0.3 to 8 and typically from about 0.5 to 5 parts per 100 parts of elastomer gum.

The elastomer gums which can be compounded with the processing aids in accordance with this invention will generally be those rubbers or elastomer gums which are of the general and special purpose types. Such gums include those of natural rubber and such synthetic, ethylenically unsaturated rubbers as poly-(ethylene-co-propylene-co-diene), polychloroprene, polyisoprene, polybutadiene, poly(butadiene-co-styrene), poly(butadiene-co-acrylonitrile), and poly(isobutylene-co-isoprene).

The processing aids of this invention will find particular value in improving the processability of vulcanizable fluoroelastomer polymers. Such polymers are described, for example, in the aforementioned prior art, e.g., U.S. Pat. Nos. 3,159,609 (Harris et al), 3,467,635 (Brasen et al), 4,214,060 (Apotheker), 4,233,421 (Worm), and 4,263,414 (West). Many of these are commercially available, sold under trademarks such as "Fluorel" and "Viton", and are copolymers of vinylidene fluoride and one or more other co-monomers. Among the fluoroelastomer polymers which may be processed in accordance with this invention are the elastomeric copolymers of two or more of the following fluoromonomers: vinylidene fluoride, hexafluoropropene, chlorotrifluoroethylene, 2-chloropentafluoropropene, fluorinated methyl vinyl ether, tetrafluoroethylene, 1-hydropentafluoropropene, dichlorodifluoroethylene, trifluoroethylene, 1,1-chlorofluoroethylene, and mixtures thereof, and optionally in addition such cure site monomers as 3-iodoperfluoropropene, 4-iodoperfluoropentene, bromotrifluoroethylene, bromodifluoroethylene, and bromotetrafluorobutane, and mixtures thereof. Said fluoromonomers may also be copolymerized with other compounds such as non-fluorinated monomers, e.g., ethylene or propylene. The preferred elastomers are copolymers of vinylidene fluoride with at least one terminally ethylenically unsaturated fluoromonomer containing at least one fluorine atom substituent on each double-bonded carbon atom, each carbon atom of said fluoromonomer being substituted only with fluorine and optionally with chlorine, hydrogen, lower fluoroalkyl radical, or lower fluoroalkoxy radical, particularly hexafluoropropene, tetrafluoroethylene, chlorotrifluoroethylene, and 1-hydropentafluoropropene. Particularly preferred are the fluorinated elastomers produced by copolymerizing vinylidene fluoride with hexafluoropropene as described in U.S. Pat. Nos. 3,051,677 and 3,318,854, and those copolymers produced by copolymerizing vinylidene fluoride, hexafluoropropene, and tetrafluoroethylene as described in U.S. Pat. No. 2,968,649. The elastomeric copolymers of hexafluoropropene and vinylidene fluoride have between about 15 and about 50 mole percent hexafluoropropene, optionally with the addition of up to 30 mole percent tetrafluoroethylene, are illustrative of this preferred class. Mixtures or blends of elastomers, e.g., of different viscosities, are also suitable.

Table 3 sets forth the approximate compositions of some commercially available vulcanizable fluoro-elastomers which are particularly useful in the practice of this invention.

TABLE 3

| | Fluoroelastomer Gums | | | |
| --- | --- | --- | --- | --- |
| | Composition of gum, mole % | | | |
| Code | $CH_2=CF_2$ | $C_3F_6$ | $C_2F_4$ | $CFCl=CF_2$ |
| A | 78 | 22 | | |
| B | 60 | 20 | 20 | |
| C* | 78 | 22 | | |
| D* | 51 | 23 | 26 | |
| E* | 50 | 21 | 29 | |
| F | 69 | | | 31 |

*These gums also contain a very small amount of a bromine-containing fluorinated monomer, the amount being such as to provide about 0.2 to 0.7 wt % bromine in the gum as a cure site for subsequent crosslinking with peroxide (see U.S. Pat. No. 4,035,565, Apotheker et al, and U.S. Pat. No. 4,263,414, West).

In addition to the above-described processing aids, there can also be incorporated into the elastomer gum those chemical and compounding ingredients or adjuvants customarily known to be useful or necessary in processing, fabricating, stabilizing, and vulcanizing such gums, for example, in the case of natural rubber and the aforementioned non-fluorinated elastomers, sulfur, peroxide, magnesium oxide, or zinc oxide may normally be incorporated as vulcanizing agents. In the case of the fluoroelastomer gums, depending upon the particular gum of this class, polyamines, aromatic polyhydroxy compounds, peroxides, and triallylisocyanurate may also be incorporated as crosslinking agents. Frequently, co-curing agents or accelerators, such as organo-onium compounds, will also be included in the compounded fluoroelastomer composition, and, just prior to curing, one can also incorporate in the conventional manner divalent metal oxide and/or hydroxide acid acceptors. Other conventional compounding agents, such as carbon black and other reinforcing agents or fillers such as calcium carbonate, clay, and silica, pigments, waxes and other conventional processing aids, softeners, plasticizers, and retarding agents, can be incorporated into the gumstock in the conventional manner.

In preparing the compounded gumstocks, the processing aids and the various gum adjuvants are milled and dispersed into the gumstock by employing any of the useful rubber mixing devices, such as internal mixers, roll mixers, or any other convenient mixing device. The temperature of the mixture in the mixing device preferably should not be allowed to rise above about 120° C.

The compounded, curable gumstock can be extruded or pressed in a mold, and subsequently heated or baked in an oven. In the case of fluoroelastomers, pressing of the compounded gumstock (called "press cure") will usually be conducted at a temperature between about 95° C. and about 230° C., preferably between about 150° C. and about 205° C. for a period of from one minute to about 15 hours, usually from five minutes to 30 minutes. A pressure of between about 700 kPa and about 20,600 kPa, preferably between about 3,400 kPa and about 6,800 kPa, is usually imposed on the compounded gumstock in the mold. The molded fluoroelastomer vulcanizate will then be usually "post cured" (oven cured) at a temperature between about 150° C. and about 315° C., usually at about 260° C. for a period of from about two hours to 50 hours or more depending on the cross-sectional thickness of the molded article. For thick sections, the temperature during the post cure will usually be raised gradually from the lower limit of the range of the desired maximum temperature selected. For thinner sections, e.g., less than 5 mm, the section may be put into the oven at the desired maximum temperature. The maximum temperature used is preferably about 260° C. and is held at this value for about 24 hours or more.

The elastomer gums or gumstocks containing the processing aids of this invention and, if desired or necessary, the chemical and compounding ingredients customarily mixed with such gums, can be used to manufacture the finished rubber goods or articles for which such gums are known to be useful, such as pump valves, tires, belting, hose or tubing, gaskets, seals, O-rings, bushings, diaphragms, and the like, the processing aids enhancing the economics of such manufacture.

The following examples are offered to aid in understanding the present invention and are not to be unduly construed as limiting the scope thereof. In these examples, the parts referred to are parts by weight and "phr" means parts per hundred parts of rubber or elastomer gum.

EXAMPLES

Example 1

To a round-bottom flask, equipped with a stirrer, condenser, heating mantle, thermometer and addition tube, were added 250 ml dimethyl formamide (DMF), 64.5 g (0.50 mole) cyanuric acid, and 101 g (1.0 mole) triethylamine. The mixture was stirred and heated to 95° C. for 1 hr., then 120 g (1.1 mole) ethyl bromide was slowly added over a period of 1.5 hrs. while stirring and maintaining the temperature at 80° to 100° C. The reaction mixture was then heated for an additional hour at 90° C. and then the temperature slowly raised to 130° C. and heating continued for 6 hrs. DMF was gradually distilled off under reduced pressure. After adding 300 ml water to the reaction vessel, the resulting mixture was cooled and filtered. The dried, solid, isocyanurate product (No. I—1 of Table 1), melting at 80°–85° C., weighed 65 g.

Example 2

Employing the apparatus of Example 1, a mixture of 120 ml DMF, 12.9 g (0.1 mole) cyanuric acid, and 20.2 g triethylamine was heated and stirred at 95° to 135° C. Octadecyl bromide (66.6 g, 0.20 mole) was then added to the stirred reaction mixture held at a temperature of about 125° C. Heating was continued for 6 hrs. at 140° C. The reaction mixture was cooled and then 200 ml water, 200 ml chloroform, and 100 ml isopropyl ether were added. After vigorous agitation, the organic layer was separated and concentrated under vacuum to yield a solid, isocyanurate product (No. I-2 of Table 1) weighing 71 g and melting at 62°–72° C.

Example 3

Employing the apparatus of Example 1, a mixture of 200 ml o-dichlorobenzene, 81 g (0.80 mole) triethylamine, 31.6 g (0.25 mole) cyanuric acid, and 99.6 g (0.80 mole) benzyl chloride was stirred and heated at reflux (170°–180° C.) for 3 hrs. After cooling to about 80° C., the triethylamine hydrochloride by-product was removed by filtration. The solid product which formed in the filtrate on cooling to room temperature was stirred with 500 ml cold isopropyl ether, then filtered and dried at 65° C. to yield 65 g of isocyanurate product (No. I-3 of Table 1) melting at 154°–155° C.

Example 4

Employing the apparatus of Example 1, a mixture of 810 g (3.0 moles) octadecyl alcohol and 318 g (3.0 moles) powdered sodium carbonate was warmed and stirred to yield a paste. To this stirred mixture was added 185.5 g (1.0 mole) of cyanuric chloride in portions at such a rate to maintain fluidity and control the exotherm. After the addition, the reaction mixture was stirred and heated at 105° C. for 5 hrs., cooled to 90° C., and 1.5 liters water added with vigorous agitation. After cooling to room temperature, the solid product was filtered, washed with water, dried in a vacuum oven at 65° C. to yield 922 g of a white, semi-solid cyanurate product (No. C-1 of Table 2).

Example 5

Following the procedure of Example 4, 108 g (0.40 mole) of octadecyl alcohol, 37.1 g (0.20 mole) cyanuric chloride, and 42.4 g (0.40 mole) sodium carbonate were reacted to yield, after isolation, water washing, and drying, 136 g of a white, cyanurate solid (No. C-2 of Table 2).

Example 6

Using the apparatus of Example 1, 52.4 g (0.1 mole) of the sodium salt of N-methylperfluorooctanesulfonamide was dissolved in 150 ml acetone by stirring. To this solution was added gradually, 6.2 g (0.033 mole) cyanuric chloride and the reaction mixture heated at 72° C. for 5 hrs. The flask was cooled in ice water, and the solid product filtered, washed with water, and dried under vacuum at 65° C. to yield 45 g of cyanurate product (No. C-3 of Table 2) melting at 146°–152° C.

Example 7

Following the procedure of Example 4, 110 g (0.34 mole) $CH_3(OC_2H_4)_6C_2H_4OH$ ("CARBOWAX" 350), and 31.8 g (0.3 mole) of sodium carbonate were stirred at about 40° C. while slowly adding 18.6 g (0.1 mole) cyanuric chloride. The resulting reaction mixture was heated slowly to 140° C. and heated at this temperature for 2 hrs. After cooling to room temperature, 100 ml acetone were added, the inorganic salts filtered, the filter cake rinsed with additional acetone, and the combined filtrates concentrated by heating at reduced pressure to yield 113 g of a pale yellow, liquid, cyanurate product (No. C-4 of Table 2).

Example 8

Following the procedure of Example 4, 91.6 g (0.2 mole) $C_8F_{17}C_2H_4OH$ and 21 g (0.2 mole) sodium carbonate were stirred at about 45° C. while slowly adding 12.4 g (0.067 mole) cyanuric chloride. The resulting mixture was stirred and heated at 90° C. for 2 hrs., then at 135° C. for 4 hrs. The cooled reaction mixture was mixed well with 100 ml water and 400 ml 1,1,2-trichlorotrifluoroethane and the organic phase separated and concentrated at reduced pressure to yield 84 g of cyanurate product (No. C-5 of Table 2).

Example 9

Following the procedure of Example 4, 75.6 g (0.13 mole) $C_8F_{17}SO_2N(C_2H_5)(C_2H_4O)_3H$ and 12.7 g (0.12 mole) sodium carbonate were stirred while adding 7.4 g (0.04 mole) cyanuric chloride in small portions. The resulting mixture was stirred and heated at 90° C. for 5 hrs. The reaction mixture was stirred well with 150 ml hot water and the flask and contents allowed to cool. The upper aqueous phase was discarded and the remaining solid product was removed from the flask and dried under vacuum to yield 82.5 g of semisolid, cyanurate product (No. C-6 of Table 2).

Example 10

Example 1 was followed except that the amount of ethyl bromide employed was 53.5 g (0.5 mole). After removal of the DMF by distillation, water and isopropyl ether were added to the residue, and the ether phase was evaporated to yield 29 g of a white, isocyanurate solid (No. I-4 of Table 1), melting at 137°–144° C.

Example 11

Example 1 was followed except that 156 g (1.1 mole) methyl iodide was reacted with the isocyanuric acid in place of ethyl bromide. Forty-two g of a white, isocyanate solid (No. I-5 of Table 1) was obtained, with a purity of 98.9% dimethyl isocyanurate for the product as indicated by gas liquid chromatography.

Example 12

Example 1 was followed except that a mixture of 109 g (1.0 mole) ethyl bromide and 60.5 g (0.5 mole) allyl bromide were used in place of the ethyl bromide. The reaction mixture was subjected to vacuum distillation to remove DMF and the residue shaken with a mixture of isopropyl ether and water. The ether layer was separated and evaporated to yield 57.5 g of a solid, isocyanurate product (No. I-6 of Table 1) as the major product.

Example 13

Employing the apparatus of Example 1 153.5 g (1.0 mole) phosphorous oxychloride and 300 g p-dioxane were placed in the reaction flask and 14.4 ml water added to the stirred solution while cooling with a water bath. Tris(hydroxyethyl)isocyanurate (87 g, 0.33 mole) was then added and the reaction mixture stirred and heated at 80° C. on a steam bath. The solids which formed after 1 hr. of heating dissolved on further heating to yield a clear solution. Heating was stopped when no further HCl gas evolution was observed. Water (18 ml) was added to the solution andd the reaction mixture stirred for 1 hr. at 40° C. and allowed to stand overnight (16 hrs) at room temperature. The p-dioxane solvent was stripped from the reaction mixture under reduced pressure up to a pot temperature of about 80° C. Isopropyl ether (300 ml) was added and the reaction mixture stirred and then cooled. The ether was decanted and the solid residue washed with 200 ml heptane and subjected to reduced pressure while heating to a pot temperature of 90° C. to remove volatiles. The isocyanurate product (wt 180 g) (No. I-7 of Table 1) was thus obtained as a viscous liquid.

Example 14

In a number of runs, fluoroelastomer gums A and B of Table 3 were compounded with processing agents of this invention and certain conventional vulcanizing adjuvants on a two-roll rubber mill. In each run, 100 parts of elastomer gum was compounded with 2.1 parts Bisphenol AF, i.e., 2,2-hexafluoroisopropylidene-bis(4-hydroxybenzene), 0.45 part triphenylbenzylphosphonium chloride, 3 parts magnesium oxide ("MAGLITE" D), 6 parts calcium hydroxide, 30 parts carbon black (N-990), and a small amount of the processing aid (except in control runs where no processing aid was used for comparison). The resulting compounded gumstocks were extruded through a Garvey-type extrusion die at 110° C., and the resulting rubber extrusions were evaluated according to ASTM Standard Method D-2230-77-Method A, Rating System B, to rate the appearance of the surfaces and edges of the extrusions. This ASTM test rates the visual appearance of the surface of the extrusion on a scale from "A" (very smooth or excellent) to "E" (rough or poor), the edge of the extrusion on a scale of "1" (ragged, rough, or poor) to "10" (sharp, uniform or excellent). In addition, the gloss and the flatness of the extrusions were evaluated visually, the gloss being rated as "P" (dull or poor), "F" (fair), or "G" (shiny or good), and the flatness of the extrusion being rated as "H" (waves or high undulations), "M" (moderately wavy), "L" (low degree of waves), or "L+" (very flat, no waves). The compositions of the compounded gumstocks and appearance of the rubber extrusions thereof are summarized in Table 4.

Example 15

In another series of runs, fluoroelastomer gums D and E of Table 3 were compounded with common vulcanizing adjuvants and processing aids of this invention, using the compounding procedures described in Example 14, and extrusions of such compounded compositions were likewise evaluated. In each run, 100 parts of the elastomer was compounded with 2.5 parts 2,5-dimethyl-2,5-bis(t-butylperoxy)hexane ("LUPERCO" 101XL, 40% active), 2.5 parts triallylisocyanurate, 3 parts litharge (Eagle-Pitcher #33), and 40 parts carbon black (N-990). The foregoing work is summarized in Table 5.

Example 16

In another series of runs, two other commercially available gums, namely NBR, a nitrile rubber, polybutadiene-co-acrylonitrile ("KRYNAC" 34.80) and SBR, poly(butadiene-co-styrene) ("PLIOFLEX" SBR 1502), were compounded with common vulcanizing adjuvants and processing aids of this invention (except in a control run), using the compounding procedures described in Example 14, and extrusions of such compounded compositions were likewise evaluated. In runs 1 and 2 and a control run, 100 parts of the NBR elastomer was compounded with 0.4 part tetramethylthiuramdisulfide, 1.5 parts sulfur, 5 parts zinc oxide, and 40 parts carbon black (N550). In runs 3 and 4, 100 parts of the SBR elastomer was compounded with 1 part mercaptobenzothiazoledisulfide, 2 parts sulfur, 3 parts zinc oxide, 50 parts carbon black (N-990), and 1 part di-beta-naphthyl-p-phenylenediamine. The foregoing work is summarized in Table 6.

Example 17

In another series of runs, fluoroelastomer gum C of Table 3 was compounded with common vulcanizing adjuvants and the processing aids of this invention, using the compounding procedures described in Example 14. In each run, 100 parts of the gum was compounded with 2.5 parts "LUPERCO" 101XL, 2.5 parts triallylisocyanurate, 10 parts litharge (Eagle-Picher #33), 40 parts carbon black (N774), and 20 parts carbon black ("AUSTIN" black). All of the compounded compositions were press cured in an untreated mold at 177° C. for 10 min. at about $7 \times 10^3$ kPa and the mold release properties determined in terms of the minimum amount of processing aid useful to obtain good release of the cured molded article from the mold and in terms of the quality of release (e.g., "G" for good release and "P" for poor release) when 3 phr of the processing aid was used. The foregoing work is summarized in Table 7.

Example 18

In another series of runs, fluoroelastomer gum F of Table 3 was compounded according to the procedure of Example 14 with processing aid I-7 of Table 1 and the extrusions of such compounded compositions were evaluated. In each run, 100 parts of the gum was compounded with 3 parts "LUPERCO" 101XL, 3 parts triallylisocyanurate, 10 parts zinc oxide, 10 parts PbHPO$_3$ ("DYPHOS"), and 10 parts carbon black (N-990). Table 8 summarizes the runs and results obtained.

TABLE 4

| Run | Elastomer gum used[1] | Processing aid used[2] | Extrusion appearance[3] | | | |
|---|---|---|---|---|---|---|
| | | | Surface | Edge | Gloss | Flatness |
| Control | A | none | D | 5 | P | M |
| 1 | A | I-1 | A | 10 | P | L+ |
| 2 | A | I-2 | A+ | 10 | G | L+ |
| 3 | A | I-2 | B+ | 9− | F− | L+ |
| 4 | A | I-4 | B | 9− | P | L |
| 5 | A | I-5 | A− | 9+ | P | L |
| 6 | A | I-6 | B+ | 9 | P | L |
| 7 | A | C-6 | A | 10 | F | L+ |
| 8 | A | C-1 | A | 10+ | P | L+ |
| 9 | A | C-4 | B | 8 | P | L+ |
| 10 | A | C-7 | B+ | 9 | P | L |
| 11 | A | C-8 | B | 8 | P | L− |
| Control | B | none | E | 2 | P | H |
| 12 | B | I-2 | A | 4 | F | L |

[1]See Table 3 for composition of gum.
[2]See Tables 1 and 2 for identity of processing aid. The amount of processing aid used was 1.5 parts in all runs except Run 3, where 0.65 part was used.
[3]ASTM D-2230-77, Method A, Rating System B.

TABLE 5

| Run | Elastomer gum used[1] | Processing aid[2] used (and amts. in parts) | Extrusion appearance[3] | | | |
|---|---|---|---|---|---|---|
| | | | Surface | Edge | Gloss | Flatness |
| Control | D | none | E | 1 | P | H |
| 1 | D | I-2 (3) | A | 9 | G | M |
| 2 | D | I-2 (4.5) | A+ | 9+ | G− | M |
| 3 | D | I-1 (3) | B+ | 8− | P | L+ |
| 4 | D | I-1 (4.5) | A | 9− | F | L+ |
| Control | E | none | E | 1 | P | H |
| 5 | E | I-1 (3) | D− | 4 | P | M |
| 6 | E | I-2 (3) | A | 3 | G | L |
| 7 | E | I-2 (4.5) | B+ | 9+ | P | M |

[1]See Table 3 for composition of gum.
[2]See Table 1 for identity of processing aid.
[3]ASTM D-2230-77, Method A, Rating System B.

TABLE 6

| Run | Elastomer gum used[a] | Processing aid used[b] (and amts. in parts) | Extrusion appearance[c] | | | |
|---|---|---|---|---|---|---|
| | | | Surface | Edge | Gloss | Flatness |
| Control | NBR | none | B | 8 | F | M− |
| 1 | NBR | C-1 (1.5) | B+ | 9+ | F | L+ |
| 2 | NBR | C-6 (0.65) | B+ | 9+ | F | L+ |
| 3[d] | SBR | C-1 (1.5) | A+ | 9 | G+ | L+ |
| 4[d] | SBR | C-6 (0.65) | A+ | 10+ | G+ | L+ |

[a]See Table 3 for composition of gum.
[b]See Table 2 for identity of processing aid.
[c]ASTM D-2230-77, Method A, Rating System B.
[d]The compounded gumstocks in this run also included 0.5 part stearic acid.

TABLE 7

| Run | Elastomer gum used[a] | Processing aid used[b] | Mold release properties | |
|---|---|---|---|---|
| | | | Amt. (phr) of processing aid for good release | Quality of release at 3 phr of processing aid |
| 1 | C | I-1 | 2.5 | G |
| 2 | C | I-2 | 3 | G |
| 3 | C | C-6 | 3 | G |
| 4 | C | C-1 | >4 | P |
| 5 | C | C-2 | 3 | G |
| 6 | C | C-3 | 3 | G |

[a]See Table 3 for composition of gum.
[b]See Tables 1 and 2 for identiy of processing aid.

TABLE 8

| Run | Elastomer gum used[1] | Processing aid used[2] | Extrusion appearance[3] | | | |
|---|---|---|---|---|---|---|
| | | | Surface | Edge | Gloss | Flatness |
| Control | F | none | E | 1 | P | M |
| 1 | F | I-7 (8 parts) | A | 3 | P | L+ |

[1]See Table 3 for composition of gum.
[2]See Table 1 for identity of processing aid.
[3]ASTM D-2230-77, Method A, Rating System B.

Various modifications and alterations of this invention will become apparent to those skilled in the art from the foregoing description and examples without departing from the scope and spirit of this invention.

What is claimed is:

1. A composition comprising fluoroelastomer gum and as a processing aid therefor a composition comprising isocyanurate of the formula:

$$(H)_n \left[ \begin{array}{c} -N \diagdown N- \\ O \diagup N \diagdown O \\ | \end{array} \right] (R^1)_{3-n}$$

where
R[1] is an aliphatic radical or aryl radical, or combinations thereof, which radicals are unsubstituted or can contain hetero atoms, chlorine, or fluorine, not more than one of said radicals containing ethylenic unsaturation, and
n is 0, 1, or 2,
or cyanurate of the formula:

$$(X)_n \left[ \begin{array}{c} N \diagdown N \\ \diagup N \diagdown \end{array} \right] (ZR^2)_{3-n}$$

where
Z is O, S, or NR (where R is H or lower alkyl),
R[2] is as defined above for R[1],
X is halogen, OH, O(M)$_{1/z}$ (where M is a metal ion and z is the valence thereof), or NHR (where R is H or lower alkyl), and
n is 0, 1, or 2.

2. The composition according to claim 1 wherein said fluoroelastomer gum comprises copolymers of two or more of vinylidene fluoride, hexafluoropropene, chlorotrifluoroethylene, 2-chloropentafluoropropene, fluorinated methyl vinyl ether, tetrafluoroethylene, 1- hydropentafluoropropene, dichlorodifluoroethylene, trifluoroethylene, and 1,1-chlorofluoroethylene, and in addition 3-iodoperfluoropropene, 4-iodoperfluoropentene, bromotrifluoroethylene, bromodifluoroethylene, or bromotetrafluorobutene, and mixtures thereof.

3. The composition according to claim 1 wherein said fluoroelastomer gum is a copolymer of vinylidene fluoride with at least one terminally unsaturated fluoromonomer containing at least one fluorine atom substituent on each double-bonded carbon atom, each carbon atom of said fluoromonomer being substituted only with fluorine and chlorine, hydrogen, lower fluoroalkyl radical, or lower fluoroalkoxy radical.

4. The composition of claim 1 wherein said fluoroelastomer gum is a copolymer of vinylidene fluoride, hexafluoropropylene, and tetrafluoroethylene.

5. The composition of claim 1 wherein said processing aid has a structure represented by the formula

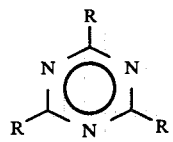

where
R is selected from the group consisting of $OC_{18}H_{37}$, $N(CH_3)SO_2C_8F_{17}$, $OC_2H_4O(C_2H_4O)_6CH_3$, $(OC_2H_4)_3N(C_2H_5)SO_2C_8F_{17}$, Cl, OH, and ONa.

6. The composition of claim 5 wherein said gum comprises a copolymer of vinylidene fluoride, hexafluoropropene, and tetrafluoroethylene, and R in the formula for said processing aid is $OC_{18}H_{37}$.

7. The composition of claim 5 wherein said gum comprises a copolymer of vinylidene fluoride, hexafluoropropene, and tetrafluoroethylene, and R in the formula for said processing aid is $(OC_2H_4)_3N(C_2H_5)SO_2C_8F_{17}$.

8. The composition of claim 1 wherein said processing aid has a structure represented by the formula

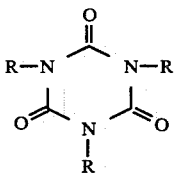

where
R is selected from the group consisting of H, $C_2H_5$, $C_{18}H_{37}$, $CH_2C_6H_5$, $CH_3$, and $C_2H_4OPO(OH)_2$.

9. The composition of claim 8 wherein said gum comprises a copolymer of vinylidene fluoride, hexafluoropropene, and tetrafluoroethylene, and in the formula for said processing aid one R is H and the other two R's are $C_2H_5$.

10. The composition of claim 8 wherein said gum comprises a copolymer of vinylidene fluoride, hexafluoropropene, and tetrafluoroethylene, and in the formula for said processing aid one R is H and the other two R's are $C_{18}H_{37}$.

11. The composition of claim 8 wherein said gum comprises a copolymer of vinylidene fluoride, hexafluoropropene, bromotrifluoroethylene or bromodifluoroethylene, and tetrafluoroethylene, and in the formula for said processing aid one R is H and the other two R's are $C_2H_5$.

12. The composition of claim 1 wherein said processing aid has a structure represented by the formula:

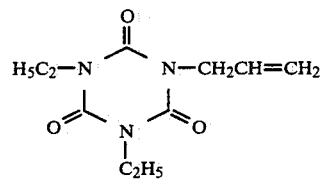

13. In the processing of an fluoroelastomer gum, the improvement comprising incorporating in said gum as a processing aid therefor a composition comprising cyanuric acid or isocyanurate of the formula:

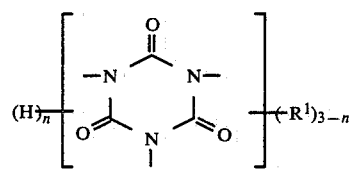

where
$R^1$ is an aliphatic radical or aryl radical, or combinations thereof, which radicals are unsubstituted or can contain hetero atoms, chlorine, or fluorine, not more than one of said radicals containing ethylenic unsaturation, and n is 0, 1, or 2,
or cyanurate of the formula:

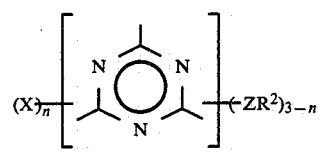

where
Z is O, S, or NR (where R is H or lower alkyl),
$R^2$ is as defined above for $R^1$,
X is halogen OH, $O(M)_{1/z}$ where M is a metal ion and z is the valence thereof), or NHR (where R is H or lower alkyl), and n is 0, 1, or 2.

14. The composition according to claim 1 wherein said fluoroelastomer gum comprises copolymers of two or more of vinylidene fluoride, hexafluoropropene, chlorotrifluoroethylene, 2-chloropentafluoropropene, fluorinated methyl vinyl ether, tetrafluoroethylene, 1-hydropentafluoropropene, dichlorodifluoroethylene, trifluoroethylene, and 1,1-chlorofluoroethylene.

15. The composition according to claim 1 wherein said fluoroelastomer gum is a copolymer of vinylidene fluoride with at least one terminally unsaturated fluoromonomer containing at least one fluorine atom substituent on each double-bonded carbon atom, each carbon atom of said fluoromonomer being substituted only with fluorine.

16. The composition of claim 1 wherein said fluoroelastomer gum is a copolymer of vinylidene fluoride and hexafluoropropylene.

17. The composition of claim 5 wherein said gum comprises a copolymer of vinylidene fluoride and hexafluoropropene, and R in the formula for said processing aid is $OC_{18}H_{37}$.

18. The composition of claim 5 wherein said gum comprises a copolymer of vinylidene fluoride and hexafluoropropene, and R in the formula for said processing aid is $(OC_2H_4)_3N(C_2H_5)SO_2C_8F_{17}$.

19. The composition of claim 8 wherein said gum comprises a copolymer of vinylidene fluoride and hexafluoropropene, and in the formula for said processing aid one R is H and the other two R's are $C_2H_5$.

20. The composition of claim 8 wherein said gum comprises a copolymer of vinylidene fluoride and hexafluoropropene, and in the formula for said processing aid one R is H and the other two R's are $C_{18}H_{37}$.

21. The composition of claim 8 wherein said gum comprises a copolymer of vinylidene fluoride, hexafluoropropene, and bromotrifluoroethylene or bromodifluoroethylene, and in the formula for said processing aid one R is H and the other two R's are $C_2H_5$.

* * * * *